United States Patent
Hardy et al.

(10) Patent No.: US 9,253,490 B2
(45) Date of Patent: Feb. 2, 2016

(54) OPTIMIZING VIDEO TRANSFER

(71) Applicant: QUALCOMM TECHNOLOGIES INTERNATIONAL, LTD., Cambridge (GB)

(72) Inventors: Philip Hardy, Ely (GB); Steven McBirnie, Cambridge (GB)

(73) Assignee: QUALCOMM TECHNOLOGIES INTERNATIONAL, LTD., Cambridge (GB)

( * ) Notice: Subject to any disclaimer, the term of this patent is extended or adjusted under 35 U.S.C. 154(b) by 216 days.

(21) Appl. No.: 13/907,552

(22) Filed: May 31, 2013

(65) Prior Publication Data
US 2014/0355664 A1  Dec. 4, 2014

(51) Int. Cl.
*G06T 1/00* (2006.01)
*G06T 17/20* (2006.01)
*G06T 5/40* (2006.01)
*H04N 1/00* (2006.01)
*H04N 7/04* (2006.01)
*H04N 13/00* (2006.01)
*H04N 19/12* (2014.01)
*H04N 19/17* (2014.01)
*H04N 19/136* (2014.01)
*H04N 19/27* (2014.01)

(52) U.S. Cl.
CPC .............. *H04N 19/12* (2014.11); *H04N 19/136* (2014.11); *H04N 19/17* (2014.11); *H04N 19/27* (2014.11)

(58) Field of Classification Search
CPC combination set(s) only.
See application file for complete search history.

(56) References Cited

U.S. PATENT DOCUMENTS

| | | | | |
|---|---|---|---|---|
| 5,553,832 | A * | 9/1996 | Zaguroli, Jr. | 254/267 |
| 6,651,252 | B1 | 11/2003 | Gordon et al. | |
| 8,073,047 | B2 * | 12/2011 | Fallon et al. | 375/240 |
| 2002/0006165 | A1 | 1/2002 | Kato | |
| 2005/0193396 | A1 | 9/2005 | Stafford-Fraser et al. | |
| 2006/0184982 | A1 * | 8/2006 | Paz et al. | 725/88 |
| 2008/0120675 | A1 * | 5/2008 | Morad et al. | 725/120 |
| 2009/0265744 | A1 * | 10/2009 | Singh et al. | 725/105 |
| 2010/0002692 | A1 * | 1/2010 | Bims | 370/389 |
| 2012/0057788 | A1 | 3/2012 | Fukuhara et al. | |
| 2012/0191805 | A1 * | 7/2012 | Fee et al. | 709/217 |
| 2014/0269930 | A1 * | 9/2014 | Robinson et al. | 375/240.24 |
| 2014/0334381 | A1 * | 11/2014 | Subramaniam et al. | 370/328 |

FOREIGN PATENT DOCUMENTS

WO    2010114512    10/2010

OTHER PUBLICATIONS

Search Report for U.K. Patent Application No. GB1320716.2 mailed Nov. 10, 2014 (3 pages).

* cited by examiner

*Primary Examiner* — Wesner Sajous
(74) *Attorney, Agent, or Firm* — The Marbury Law Group, PLLC

(57) ABSTRACT

Methods of optimized video transfer are described in which display data is divided into a plurality of portions, each portion corresponding to a class of image data, and the different portions are encoded for transmission to a remote display device using different encoding schemes. In an embodiment, the composite display data is never rendered at the source device and instead portions of display data are generated by an application based on an advertised set of classes of image data. In other embodiments, the composite display data is stored in a framebuffer at the source device and is split into portions according to a classification of the display data. In various embodiments the classification may be performed based on sniffing graphics commands used to generate the composite display data and in other embodiments, the classification may be performed based on a rate of change of pixels in the composite display data.

18 Claims, 10 Drawing Sheets

OPTIMIZING VIDEO TRANSFER

BACKGROUND

Many systems involve the transfer of video data and examples include remote display systems where the display on a device, such as a mobile telephone, is transferred onto a remote display which may, for example, be a high definition monitor. This enables the display on a small form factor device to be viewed on a much larger screen.

The embodiments described below are not limited to implementations which solve any or all of the disadvantages of known methods and systems for video transfer.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Methods of optimized video transfer are described in which display data is divided into a plurality of portions, each portion corresponding to a class of image data, and the different portions are encoded for transmission to a remote display device using different encoding schemes. In an embodiment, the composite display data is never rendered at the source device and instead portions of display data are generated by an application based on an advertised set of classes of image data. In other embodiments, the composite display data is stored in a framebuffer at the source device and is split into portions according to a classification of the display data. In various embodiments the classification may be performed based on sniffing graphics commands used to generate the composite display data and in other embodiments, the classification may be performed based on a rate of change of pixels in the composite display data.

A first aspect provides a method comprising, at a computing device: using a plurality of encoders to encode different portions of display data using different encoding schemes; multiplexing the encoded portions together to form a single stream; and transmitting the stream to a remote display device over a transmission link, wherein the display data is divided into the different portions according to a plurality of classes of image data.

A second aspect provides a system comprising a computing device, the computing device comprising: a source of display data; a plurality of encoders, wherein each encoder is arranged to encode a portion of display data using an encoding scheme; and a multiplexer arranged to multiplex the encoded portions together to form a single stream for transmission to a remote display device over a transmission link, wherein the display data is divided into the different portions according to a plurality of classes of image data.

The methods described herein may be performed by software in machine readable form on a tangible storage medium e.g. in the form of a computer program comprising computer program code means adapted to perform all the steps of any of the methods described herein when the program is run on a computer and where the computer program may be embodied on a computer readable medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

This acknowledges that firmware and software can be valuable, separately tradable commodities. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which.

Figure 1:
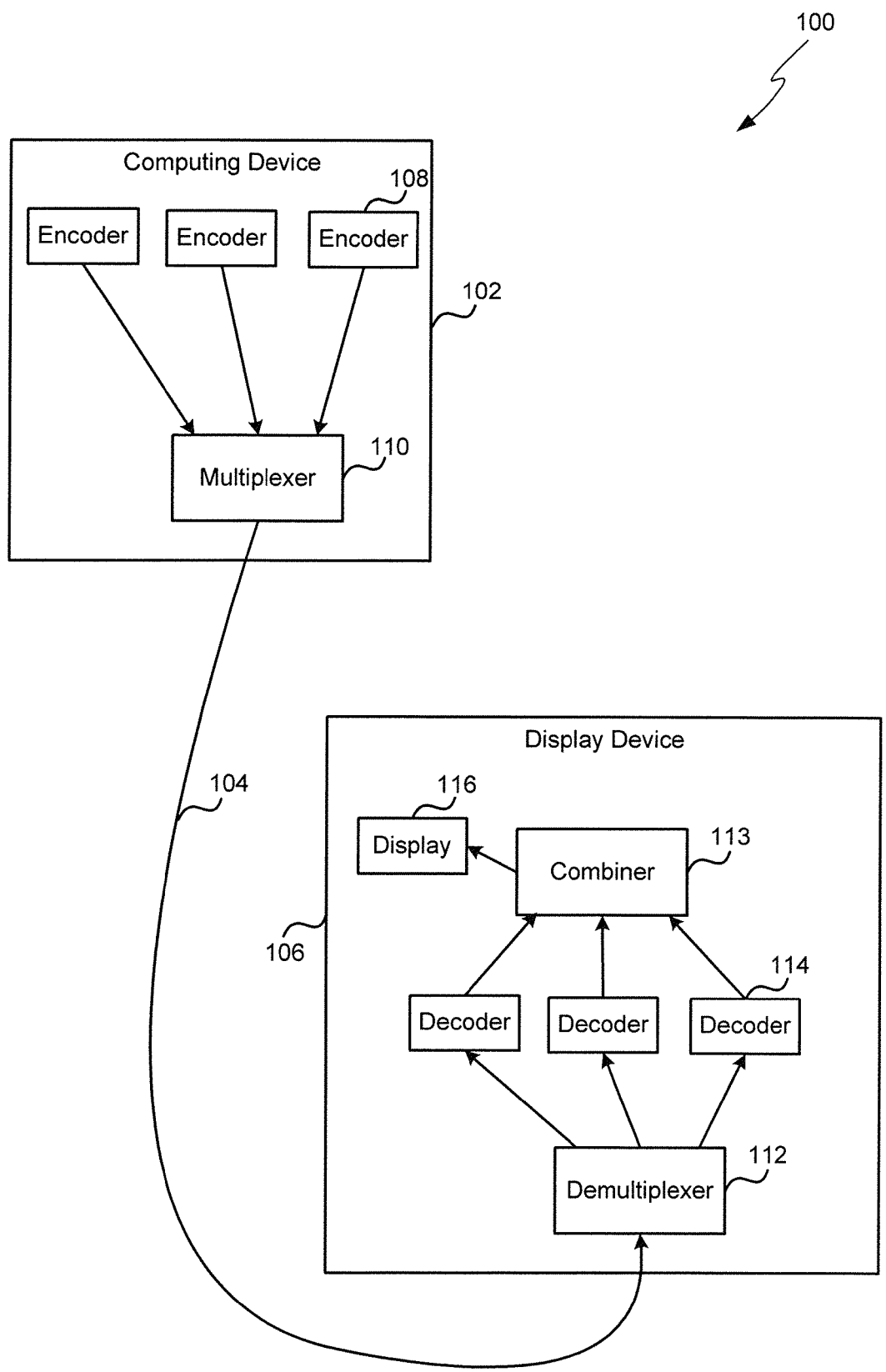
FIG. 1 is a schematic diagram of an example video transfer system.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above there are many systems which involve the transfer of video data and examples include remote display systems where the display on a mobile computing device, such as a mobile telephone, is transferred onto a remote display and the transfer of video data may be over a wireless link. Video data is comprised of multiple classes of image data (e.g. a video stream, bitmap graphics and a cursor) and current systems are typically optimized for a particular class of image data which means that the transmission of composite video data (i.e. video data comprised of multiple classes) is inefficient. This inefficiency leads to an increase in the power consumption of the source computing device (which generates the video data) such as a mobile computing device.

FIG. 1 is a schematic diagram of an example video transfer system 100 which may, for example, be a remote display system. The system 100 comprises a computing device 102, which may be a mobile computing device such as a mobile telephone, tablet computer, handheld gaming device, digital camera, etc. Video data is transferred from the computing device 102 over a transmission link 104 to a display device 106. The transmission link 104 may, for example, be a wireless link (e.g. using Bluetooth™ or Wi-Fi™). The display device 106 comprises a demultiplexer 112, a plurality of decoders 114, a combiner 113 and a display 116. In an example, the demultiplexer 112, plurality of decoders 114 and combiner 113 may be implemented in hardware with a connection (e.g. DVI or HDMI) to a monitor (as display 116). In another example the display device 106 may comprise a smart TV and the demultiplexer 112, plurality of decoders 114 and combiner 113 may be implemented in software running on the smart TV.

Figure 2:
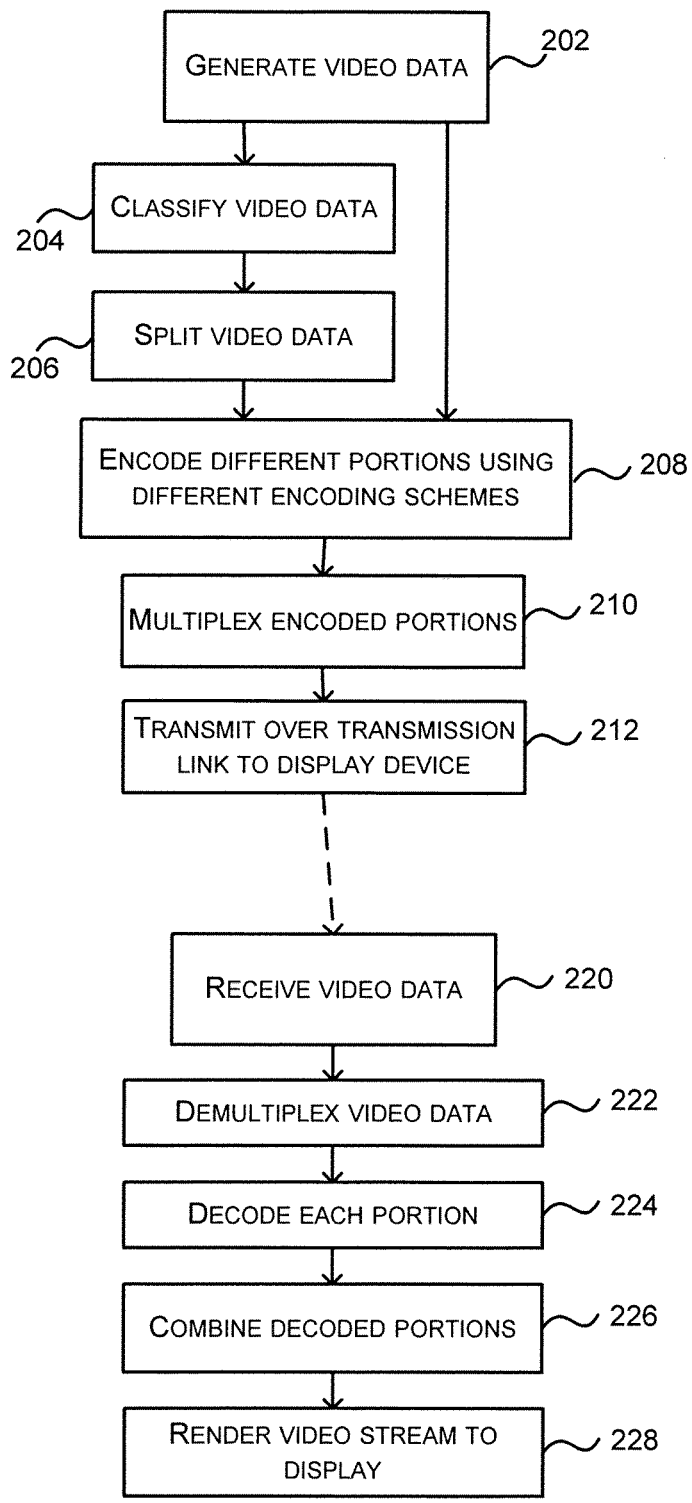
FIG. 2 is a flow diagram of an example method of optimized video transfer.

The operation of the system of FIG. 1 can be described with reference to FIG. 2 which shows a flow diagram of an example method of optimized video transfer. Video data is generated by the computing device 102 (block 202) and as described above, this video data may comprise multiple classes of image data. Examples of classes of image data include: graphics, video and a mouse cursor, although there may be more classes and any of these high level classes may be split into more than one class. Further examples of classes of image data include: bitmap graphics (e.g. text/logo), JPEG images, text on a background (e.g. on a solid background), photographs, compressed video (e.g. MPEG video), layered 2D data, vector graphics, etc. The previous examples of classes all relate to 2D image data and the classes may further cover 3D graphics, e.g. 3D meshes, textures, etc.

The video data which is generated by the computing device 102 (in block 202) may be generated as composite video data and then this composite video data may be classified to determine which parts of the data belong to different classes (block 204). Following classification, the video data is split into portions (block 206) where each portion corresponds to a class of image data. Each portion may correspond to a different class of image data or there may be more than one portion which corresponds to the same class of image data (e.g. two video portions). Each portion of image data is then sent to a different one of the plurality of encoders 108 in the computing device 102.

Alternatively, the video data which is generated by the computing device (in block 202) may never be combined to form the composite video data and in which case it is not necessary to classify and split the data (blocks 204-206 omitted) and each class of image data which is generated (in block 202), i.e. each portion of the video data, is sent to a different one of the plurality of encoders 108 in the computing device 102.

The encoders 108 within the computing device 102 are arranged to use different encoding schemes to encode portions of the video data for transmission over the transmission link 104 (block 208). In some examples, each encoder may use a different encoding scheme or there may be two or more encoders (within the set of encoders in a computing device 102) that use the same encoding scheme. Examples of encoding schemes which may be used include, but are not limited to: lossy compression schemes (e.g. H.264) and lossless compression schemes (e.g. Huffman based compression, run-length encoding). In some examples, proprietary encoding schemes may be used. In various examples, there may be two or more encoders which use the same encoding scheme but with different update rates. It will be appreciated that for any particular video stream (generated in block 202), some or all of the encoders 108 in the computing device 102 may be used to encode the portions.

Where the original portion of the video data input to an encoder 108 is already encoded (e.g. an MPEG video), the encoder 108 further encodes the portion of the video data (e.g. an encoder may re-encode the MPEG video to reduce the frame rate, resolution or color depth). In some examples, however, the plurality of encoders 108 in the computing device 102 may include a null encoder which acts as a pass through and does not apply any encoding scheme. For example, if a region in the source image is derived from an MPEG video and both sending and receiving systems (the computing device 102 and the display device 106) support this codec, the MPEG data may be transferred directly in the multiplexed stream. This avoids the computational complexity and latency of transcoding from one format to another.

The outputs of the plurality of encoders 108 are then multiplexed together (block 210) using a multiplexer 110 in the computing device 102 before being transmitted over the transmission link 104 to the display device 106 (block 212). When the outputs are multiplexed together (in block 210), information may be added to the multiplexed video stream for use by the display device 106 in demultiplexing the video stream. For example, the multiplexer 110 may combine the streams from the various encoders 108 by encapsulating data from each frame that describes the streams to the display device 106 (e.g. to the demultiplexers 112 and combiner 113 within the display device). This description may, for example, comprise properties (or is a reference to previously communicated properties) such as location, size, z-plane position, transparency, decoder type and decoder instance (where there are multiple decoders using the same encoding/decoding scheme).

The display device 106 receives the multiplexed video stream over the transmission link 104 and demultiplexes it into the individual portions (block 220) using a demultiplexer 112. The demultiplexer 112 may use any additional information added to the transmitted video stream to correctly split the stream into portions and in some examples, the portions in the display device 106 may not be exactly the same as in the computing device 102 (although in other examples they may be exactly the same). Each portion is then decoded (block 224) by one of the plurality of decoders 114 in the display device 106. As with the encoders 108 in the computing device 102, each of the decoders 114 may be arranged to decode a different encoding scheme or there may be more than one decoder 114 which is arranged to decode the same encoding scheme. Once the portions of the video data have been decoded (in block 224), the outputs from the various decoders are combined (block 226) using combiner 113 and rendered to the display 116 in the display device 106 (block 228).

The group of decoders which are used to decode any received video stream may comprise all the decoders 114 in the display device 106 or may comprise only a subset of the plurality of decoders provided within the display device. The group of decoders 114 which are used will correspond closely to the group of encoders 108 which are used to encode the video data because, for example, if an encoder 108 encodes a portion using Huffman based compression, then a decoder 114 is required at the display device which is capable of decoding data encoded using Huffman based compression. However, the group of decoders 114 which are used may not correspond exactly to the group of encoders 108 which are used because where the original portion of video data was already encoded, prior to further encoding by an encoder 108, a decoder 114 may be used which is capable of decoding both encoding schemes or two separate decoders may be used. Alternatively, if the encoder 108 was a null encoder, a decoder 114 is used which is capable of decoding the original encoding scheme (and which does not correspond to the encoding scheme, the null scheme, used by the encoder 108). It will be appreciated that in the overall system, the decoding activities will mirror the encoding activities in order that all the data can be decoded, however, some of the initial encoding may have been performed external to the computing device 102.

As there is a correspondence between the encoders 108 used at the computing device 102 (in block 208) and the decoders 114 used at the display device (in block 224), the encoding schemes (and hence encoders) used at the computing device 102 may be selected based on the capabilities of the display device 106. For example, the encoders 108 at the computing device 102 may comprise a large number (e.g. super set) of encoders 108, some of which do not correspond to any of the decoders 114 at the display device 106 to which a particular video stream is to be transmitted (in block 212). Consequently, the computing device 102 may map the different portions of the video data to encoders (or encoding schemes) based on the available decoders at the display device. To enable this prior to the transmission of the video data, the computing device 102 and display device 106 may communicate to discover the display capabilities of the remote display device 106. If the computing device transmits video data to more than one display device, this mapping may change according to the particular display device being used at any time. The mapping may also be adapted based on other factors such as feedback from the encoders and bandwidth of the transmission link 104.

In some examples, an encoder 108 may be arranged to perform transcoding of a portion of video data. In such an example, the portion of data input to the encoder may be encoded using a first encoding scheme which cannot be decoded by any of the decoders at the display device. The encoder may therefore transcode the portion of data such that the data output from the encoder is no longer encoded using the first encoding scheme but is, instead, encoded using a second encoding scheme, where the second encoding scheme can be decoded by one of the decoders at the display device.

There may be other reasons why transcoding is performed at the computing device. If, for example, the display device comprises only one decoder for a particular encoding scheme, e.g. only one MPEG decoder, and the video data comprises two portions which comprise MPEG video, one of these portions may be transcoded by an encoder at the computing device to an encoding scheme which corresponds to an available decoder at the remote display device.

Figure 3:
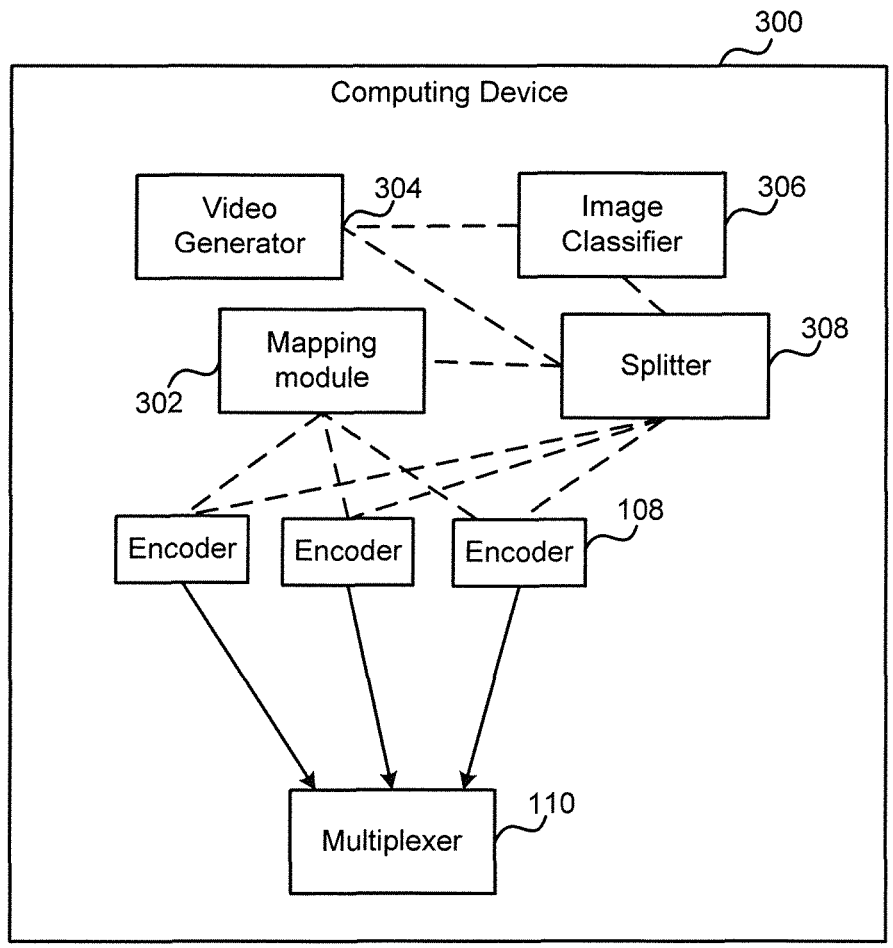
FIG. 3 shows a schematic diagram of another computing device which may be used in the system of FIG. 1.

FIG. 3 shows a schematic diagram of another computing device 300 (e.g. a mobile computing device) which may be used in the system of FIG. 1 instead of computing device 102. This computing device 300 shows additional functional elements which are not shown in computing device 102; however, it should be appreciated that computing device 102 may comprise one or more of the additional functional elements shown in FIG. 3.

The computing device 300 comprises a mapping module 302. The mapping module 302 may be arranged to perform the mapping between classes of image data (and/or portions of video data) and encoders or encoding schemes and as described above, this mapping may be fixed or may change and may be dependent upon the capabilities of the remote display device. In some examples, an encoder 108 may provide feedback to the mapping module 302 if the compression used by the encoder is inefficient and the mapping module 302 may change the mapping based on this feedback. For example, where there is a still image within a video sequence, encoding this as a "video" class is inefficient and instead an encoding scheme suitable for still images may be used (e.g. a JPEG compression). In another example, where a video shows titles or credits on a black background, this may be more efficiently encoded with a bitmap encoder rather than a video encoder.

In some examples, the mapping module 302 may modify the mapping where the bandwidth of the transmission link 104 is limited. For example, initially the video stream (which is one portion of the video data) may be encoded using Huffman based compression and a run-length encoded scheme may be used for the bitmap data (which is another portion of the video data). If the bandwidth of the transmission link is found to limit throughput, the first portion (the video stream) may instead be mapped to a lossy compression scheme (providing video with more artefacts) whilst keeping the frame rate high. In contrast the second portion (the bitmap data) may instead have the update rate reduced whilst maintaining high clarity. A cursor may be a third class (and hence third portion) and for this portion, response time (i.e. low latency) is important for a good user experience and so it may be given priority on the transmission link whilst using an encoding scheme which keeps the data rate low.

The computing device 300 further comprises a video generator 304 which is arranged to generate the video data (e.g. as in block 202 of FIG. 2), an image classifier 304 which is arranged to classify the video data (e.g. as in block 204) and a splitter 306 which is arranged to split the video data based on the output of the classifier 304 (e.g. as in block 206). The data output by the image classifier 304 may, for example, comprise region information which identifies regions of the video data as being of different classes (e.g. region 1 is a video stream, region 2 is a bitmap graphic and region 3 is a cursor). As described above, in some examples, the image classifier 304 and splitter 306 may not be required as the video data may never be combined into the composite video data but may be generated in the individual portions and these portions may be sent directly to the different encoders 108.

Although FIG. 3 shows both a mapping module 302 and an image classifier 306, it will be appreciated that in some examples, a single module may perform both classification and mapping. Similarly, a single module may perform any or all of mapping, classification and splitting.

Figure 4:
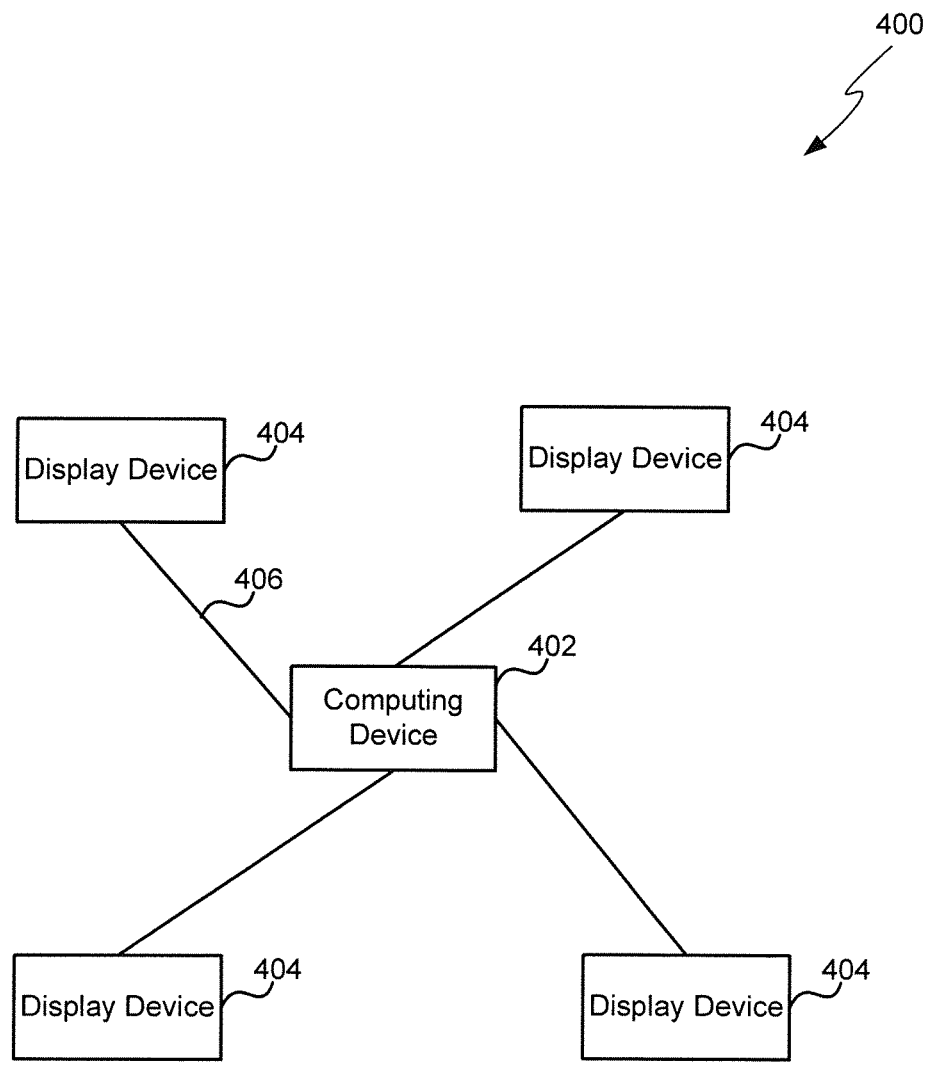
FIG. 4 is a schematic diagram of another example video transfer system.

Although FIG. 1 only shows a single display device 106, the same video data may be displayed on more than one display device, as shown in the schematic diagram in FIG. 4. FIG. 4 is a schematic diagram of another example video transfer system 400 which comprises one computing device 402 and a plurality of display devices 404. The computing device 402 may be as described above (e.g. as shown in either FIG. 1 or 3) and the transmission links 406 may be wired or wireless and in some examples, the system 400 may comprise some wired links and some wireless links. Each of the display devices 404 may be the same or they may be different (e.g. a desktop monitor, a TV-screen, a large situated display, etc), e.g. they may have different display capabilities.

As described above, the mapping of classes of image data (or their corresponding portions of the video data) to encoders (or encoding schemes) may depend on the capabilities of the display device to which the video data is transmitted. Where the computing device 402 transmits the same video data to multiple display devices 404 at substantially the same time, the mapping may be selected based on the least capable display device.

The system 100 in FIG. 1 shows a point-to-point link and the system 400 in FIG. 4 shows a point-to-multipoint system.

It will be appreciated that a further example system may comprise a plurality of computing devices and at any one time, a display device in such a system may be receiving video data from one or more computing devices.

Figure 5:
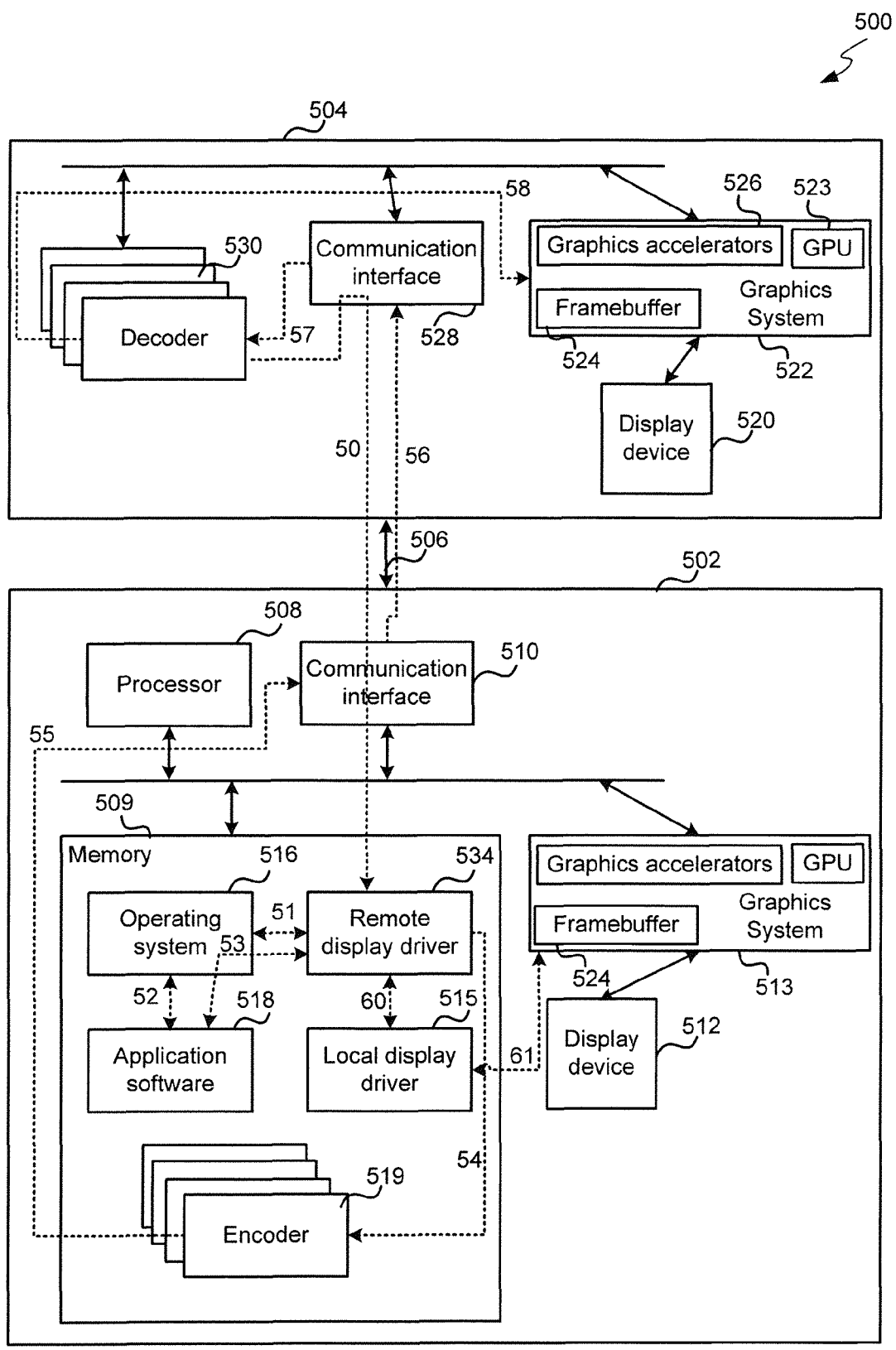
FIG. 5 is a schematic diagram of a further example video transfer system.
Figure 6:
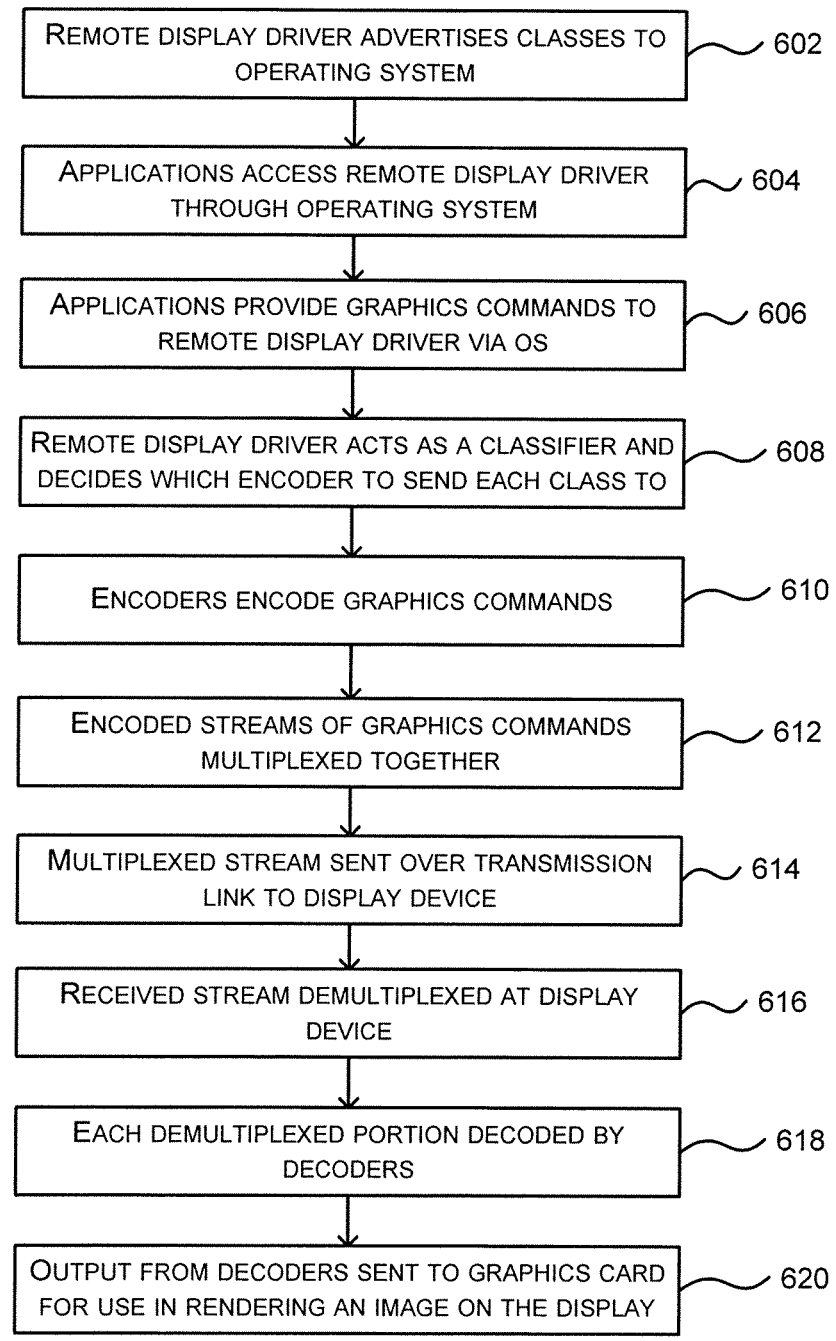
FIG. 6 is a flow diagram of a further method of optimized video transfer.

FIG. 5 is a schematic diagram of a further example video transfer system 500 which may be considered a more detailed example of the systems 100, 400 described above. The operation of this system 500 may be described with reference to FIG. 6 which is a flow diagram of another example method of optimized video transfer. FIG. 6 may be considered a more detailed example of the method shown in FIG. 2.

FIG. 5 shows a computing device 502, which may be a mobile computing device, and a display device 504 which are connected by a transmission link 506 (which may be a wireless link). The computing device 502 comprises a processor 508, a memory 509 and a communication interface 510. If the computing device 502 comprises a local display 512 (e.g. which may be integral to the computing device 502, such as the small form factor display on a mobile telephone or tablet computer), the computing device 502 may further comprise a graphics system 513 (e.g. a graphics card) and local display driver 515 (which may be implemented in software and stored in memory 509). Platform software comprising an operating system 516 or any other suitable platform software may be provided at the computing-based device to enable application software 518 to be executed on the device. The computing device 502 further comprises a plurality of encoders 519 which may be implemented in software (and stored in memory 509) and/or in hardware.

FIG. 5 also shows a display device 504, which may be located close to the computing device 502 (e.g. in the same room) or more remotely from the computing device 502 (e.g. in another country with the communication link 506 being over the internet). The display device 504 does not necessary comprise the full functionality of the computing device 502 but may only comprise the functionality required to render graphics to a display device 520. The rendering is performed by a graphics system 522 which comprises a GPU (Graphics Processing Unit) 523, framebuffer 524 and in some examples, one or more graphics accelerators 526. The display device 504 further comprises a communication interface 528 and a plurality of decoders 530 which may be implemented in software and/or in hardware. Where one or more of the decoders 530 are implemented in software, the display device 504 may further comprise a memory (to store the decoder instructions) and a processor (to execute the stored instructions).

The optimized video transfer is implemented in the computing device 502 using the plurality of encoders 519, the communication interface 510 (to perform the transmission to the display device 504 and in some examples to perform the multiplexing of the outputs of the encoders 519, where a separate multiplexer is not provided) and a remote display driver 534 (which may be implemented in software and stored in memory 509). To the operating system 516 and applications 518 it appears that they are rendering images on a local display (e.g. display device 512); however, the video data is transferred transparently to the remote display device 504.

The remote display driver 534 advertises a plurality of classes of image data to the operating system 516 (block 602, arrow 51), where these classes correspond to the capabilities of the remote display device 504 (e.g. based on the decoders 530 available at the remote display device 504). The information about the decoders 530 may have been previously passed from the display device 504 to the remote display driver 534 via the communication interfaces 528, 510 (arrow 50). The applications 518 access the remote display driver 534 and find its capabilities (e.g. which relate to the advertised classes) through the operating system 516 (block 604, arrow 52).

When an application 518 attempts to render something to a display, it provides graphics commands to the remote display driver 534 via the operating system 516 (block 606, arrow 53). The remote display driver 534 acts as a mapping module/image classifier and determines which encoder 519 to send each class of graphics commands to (block 608, arrow 54).

The encoders 519 encode the graphics commands received from the remote display driver 534 (block 610) and the output of the encoders are sent to the communication interface 510 (arrow 55). The communication interface 510 multiplexes the encoder outputs together (block 612) or alternatively a separate multiplexer may be provided and then the communication interface 510 transmits the multiplexed video stream over the communication link 506 to the display device 504 (block 614, arrow 56).

Within the display device 504, the communication interface 528 demultiplexes the received signal (block 616) and as described above, this may be based on additional information inserted into the signal when the encoder outputs were multiplexed together (in block 612). Alternatively, a separate demultiplexer may be provided within the display device 504. The various outputs from the demultiplexing operation are output to the decoders 530 (arrow 57) which perform the decoding (block 618). The output from the decoders (the graphics commands) are then sent to the graphics system 522 (arrow 58) where they are used to render the video on the display 520 (block 620).

Using the method shown in FIGS. 5 and 6 and described above, the source images (from the application 518) are never rendered in their entirety at the computing device 502 and it should be noted that the method does not use a framebuffer at the computing device 502. The only place that the images are rendered in their entirety and stored in a framebuffer 524 is at the display device 504. This improves memory bandwidth and reduces processing load at the computing device 502 which may be particularly beneficial where the computing device 502 is a handheld, resource constrained device (e.g. in terms of processing power, memory and/or battery power).

Referring back to FIG. 3, in this embodiment there is no classifier 306 or splitter 308 and the mapping is managed within the remote display driver and/or the application (based on the capabilities advertised by the remote display driver).

Although in the description of FIGS. 5 and 6 above, the video is rendered on the remote display device 520, in further examples the video may additionally be rendered on a local display 512. In such an example, the remote display driver 534 may pass the graphics commands to the local display driver 515 (arrow 60) and the local display driver 515 may write to the local framebuffer 524 (arrow 61).

Figure 7:
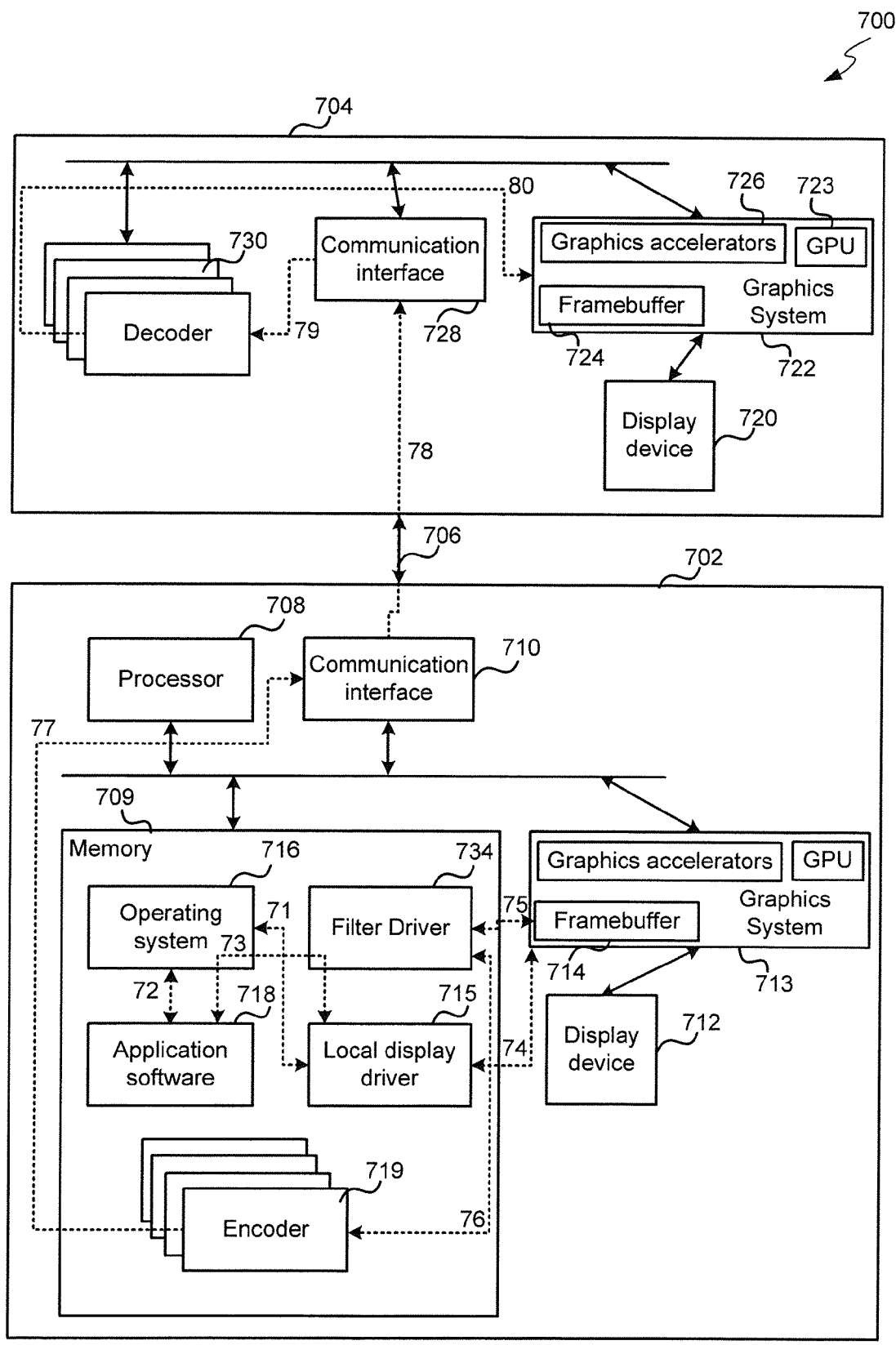
FIG. 7 is a schematic diagram of a yet further example video transfer system.
Figure 8:
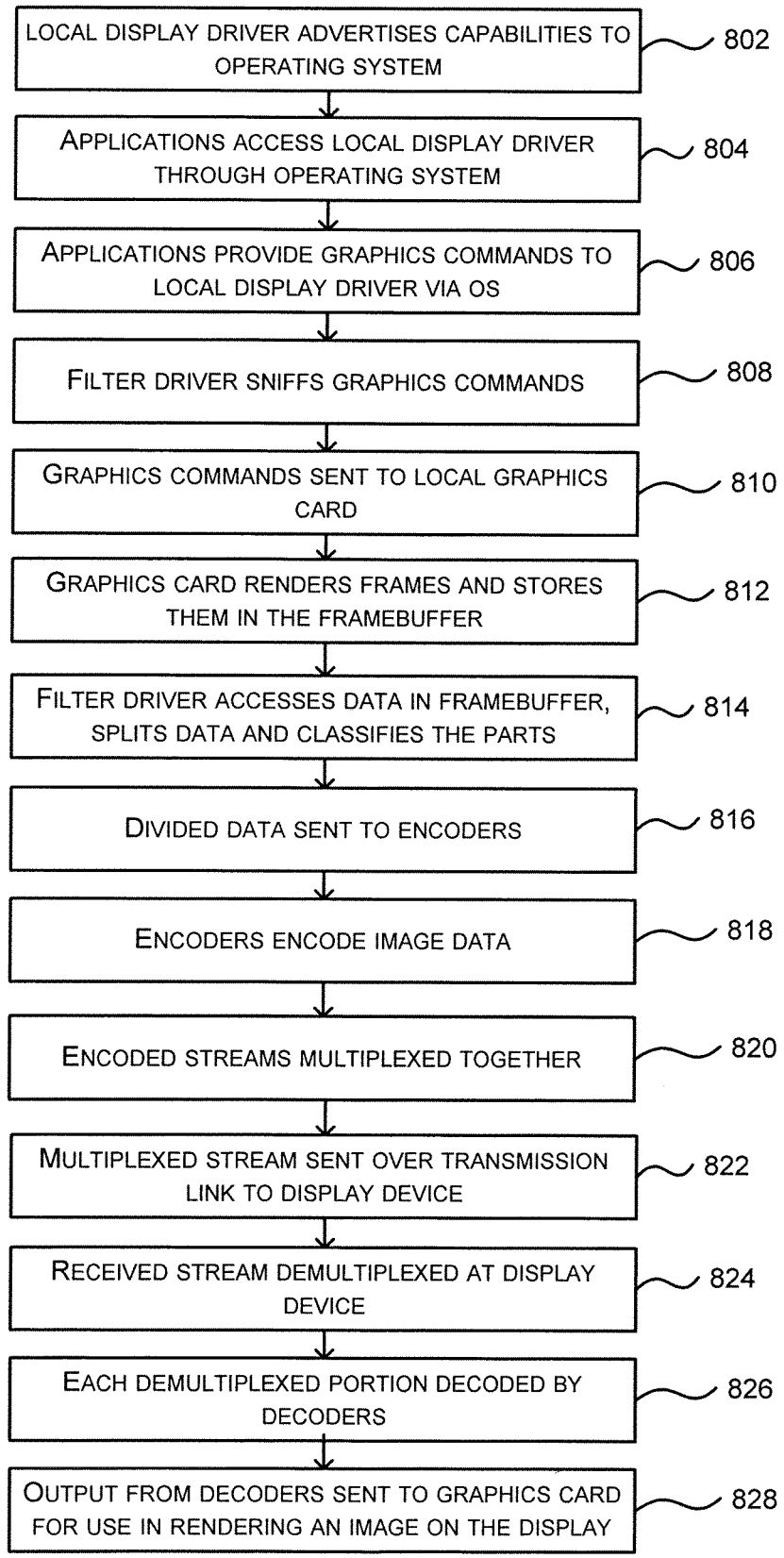
FIG. 8 is a flow diagram of a yet further method of optimized video transfer.

FIG. 7 is a schematic diagram of a further example video transfer system 700 which may be considered a more detailed example of the systems 100, 400 described above. The operation of this system 700 may be described with reference to FIG. 8 which is a flow diagram of a further example method of optimized video transfer. FIG. 8 may be considered a more detailed example of the method shown in FIG. 2.

FIG. 7 shows a computing device 702, which may be a mobile computing device, and a display device 704 which are connected by a transmission link 706 (which may be a wireless link). The computing device 702 comprises a processor 708, a memory 709 and a communication interface 710, a local display 712 (e.g. which may be integral to the computing device 702, such as the small form factor display on a mobile telephone or tablet computer), a graphics system 713

(which comprises a framebuffer 714) and local display driver 715 (which may be implemented in software and stored in memory 709). Platform software comprising an operating system 716 or any other suitable platform software may be provided at the computing-based device to enable application software 718 to be executed on the device. The computing device 702 further comprises a plurality of encoders 719 which may be implemented in software (and stored in memory 709) and/or in hardware.

FIG. 7 also shows a display device 704, which may be located close to the computing device 702 (e.g. in the same room) or more remotely from the computing device 702. The display device 704 does not necessary comprise the full functionality of the computing device 702 but may only comprise the functionality required to render graphics to a display device 720. The rendering is performed by a graphics system 722 which comprises a GPU (Graphics Processing Unit) 723, framebuffer 724 and in some examples, one or more graphics accelerators 726. The display device 704 further comprises a communication interface 728 and a plurality of decoders 730 which may be implemented in software and/or in hardware. Where one or more of the decoders 730 are implemented in software, the display device 704 may further comprise a memory (to store the decoder instructions) and a processor (to execute the stored instructions).

The optimized video transfer is implemented in the computing device 702 using the plurality of encoders 719, the communication interface 710 (to perform the transmission to the display device 704 and in some examples to perform the multiplexing of the outputs of the encoders 719, where a separate multiplexer is not provided) and a filter driver 734 (which may be implemented in software and stored in memory 709). To the operating system 716 and applications 718 it appears that they are rendering images on the local display 712, however, the video data is transferred transparently to the remote display device 704 and the image is rendered on both the local and remote displays 712, 720.

The local display driver 715 advertises its capabilities to the operating system 716 (block 802, arrow 71), where these capabilities are based on the local capabilities (e.g. graphics system 713 and display device 712). The applications 718 access the local display driver 715 and find its capabilities through the operating system 716 (block 804, arrow 72).

When an application 718 attempts to render something to a display, it provides graphics commands to the local display driver 715 via the operating system 716 (block 806, arrow 73) and the filter driver 734 sniffs these commands (block 808, as indicated by arrow 73 passing through the filter driver 734), i.e. the filter driver 734 observes but does not change the graphics commands which continue to their original destination (in contrast to the previous embodiment where the remote display driver intercepted the graphics commands). In the standard way, the graphics commands are sent to the local graphics system 713 by the local display driver 715 (block 810, arrow 74) and the graphics system 713 renders the frames and stores them in the framebuffer 714 (block 812).

The filter driver 734 accesses the image data stored in the framebuffer 714 (arrow 75) and classifies and splits the data into portions (block 814), each portion comprising a class of image data, based on the information obtained by sniffing the graphics commands (in block 808). The classification and splitting of the data (in block 814) may be performed by observing which regions are targeted by each class of drawing commands and using this information to determine which regions are video, which are photographs, which are bitmap graphics, etc. The individual portions of data generated by the filter driver 734 (in block 814) are then sent to the encoders 719 by the filter driver 734 (block 816, arrow 76), such that the filter driver 734 also performs the class/portion to encoder mapping. Referring back to FIG. 3, it can be seen that the filter driver 734 acts as the mapping module 302, the image classifier 306 and the splitter 308.

The encoders 719 encode the image data received from the filter driver 734 (block 818) and the output of the encoders are sent to the communication interface 710 (arrow 77). The communication interface 710 multiplexes the encoder outputs together (block 820) or alternatively a separate multiplexer may be provided and then the communication interface 710 transmits the multiplexed video stream over the communication link 706 to the display device 704 (block 822, arrow 78).

Within the display device 704, the communication interface 728 demultiplexes the received signal (block 824) and as described above, this may be based on additional information inserted into the signal when the encoder outputs were multiplexed together (in block 820). Alternatively, a separate demultiplexer may be provided within the display device 704. The various outputs from the demultiplexing operation are output to the decoders 730 (arrow 79) which perform the decoding (block 826). The output from the decoders are then sent to the graphics system 722 (arrow 80) where they are used to render the video on the display (block 828).

In this example, the content of the framebuffer 724 in the display device 704 matches the content of the framebuffer 714 in the computing device 702; however the transfer of this data between the computing device 702 and display device 704 has been performed with improved efficiency. Although FIG. 7 shows the framebuffer 714 being located within the graphics system 713, it will be appreciated that it may alternatively be implemented in the main processor memory 709.

Figure 9:
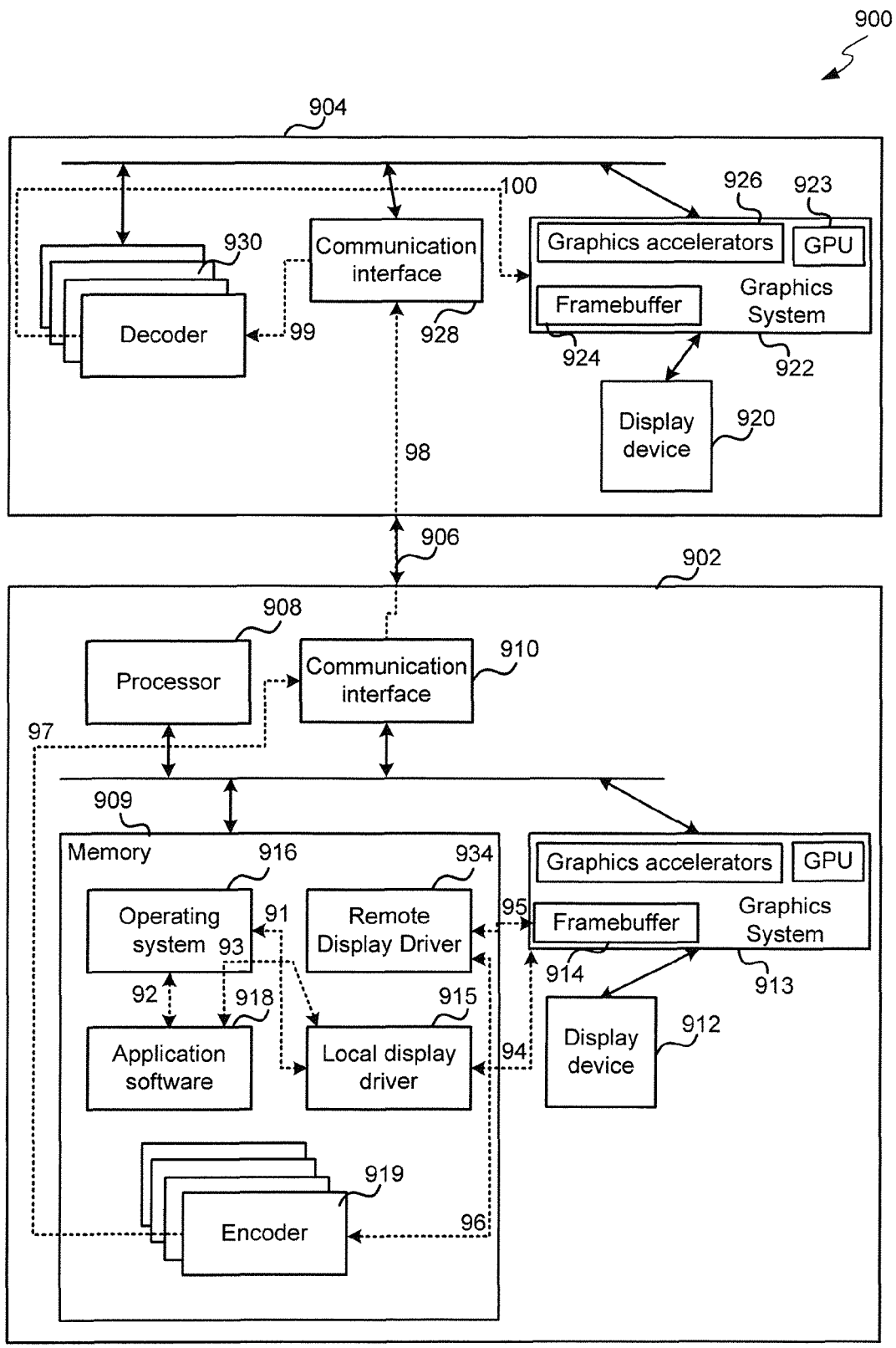
FIG. 9 is a schematic diagram of another example video transfer system.
Figure 10:
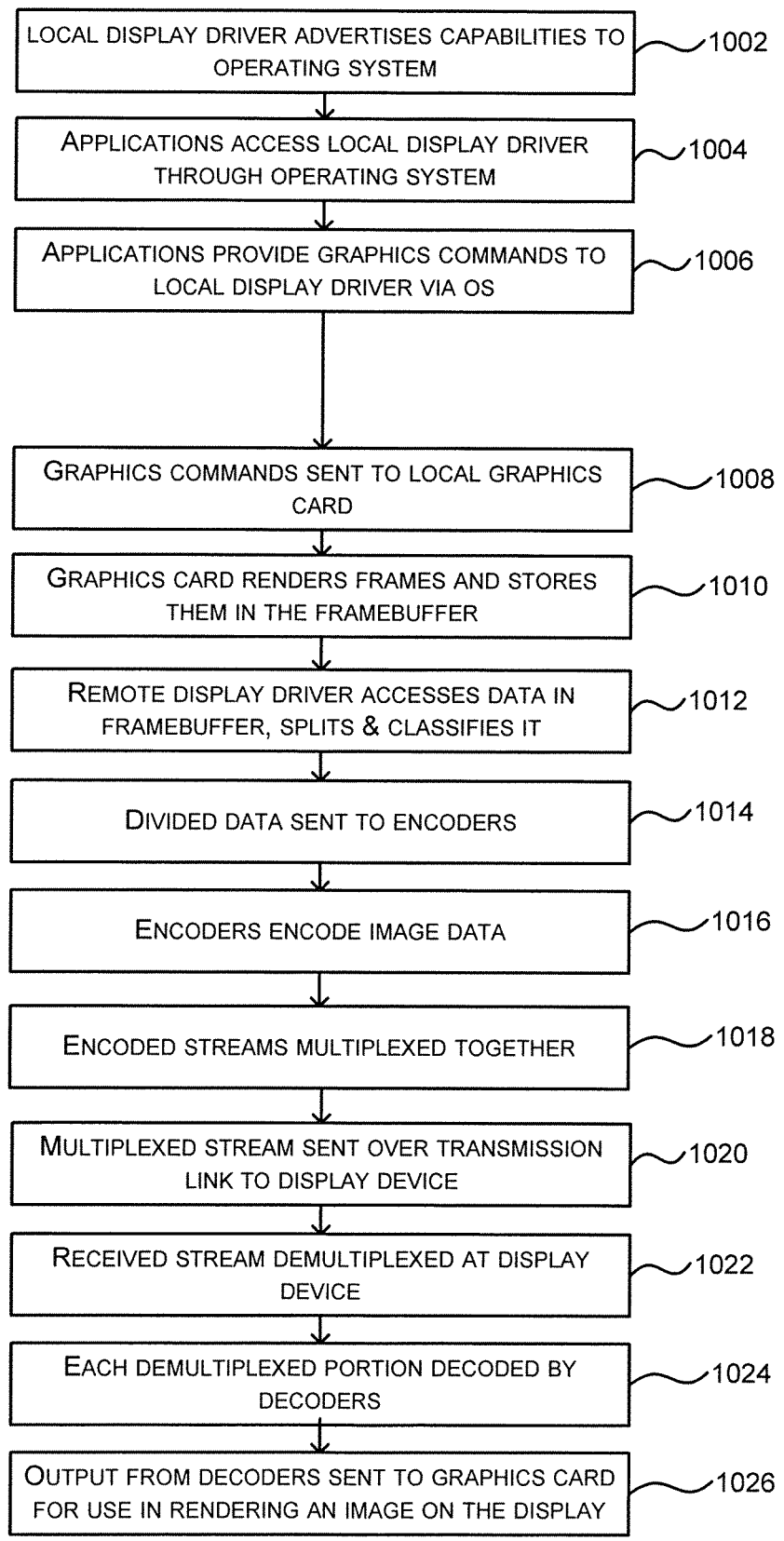
FIG. 10 is a flow diagram of another method of optimized video transfer.

FIG. 9 is a schematic diagram of a further example video transfer system 900 which may be considered a more detailed example of the systems 100, 400 described above. The operation of this system 900 may be described with reference to FIG. 10 which is a flow diagram of a yet further example method of optimized video transfer. FIG. 10 may be considered a more detailed example of the method shown in FIG. 2.

FIG. 9 shows a computing device 902, which may be a mobile computing device, and a display device 904 which are connected by a transmission link 906 (which may be a wireless link). The computing device 902 comprises a processor 908, a memory 909 and a communication interface 910, a local display 912 (e.g. which may be integral to the computing device 902, such as the small form factor display on a mobile telephone or tablet computer), a graphics system 913 (which comprises a framebuffer 914) and local display driver 915 (which may be implemented in software and stored in memory 909). Platform software comprising an operating system 916 or any other suitable platform software may be provided at the computing-based device to enable application software 918 to be executed on the device. The computing device 902 further comprises a plurality of encoders 919 which may be implemented in software (and stored in memory 909) and/or in hardware.

FIG. 9 also shows a display device 904, which may be located close to the computing device 902 (e.g. in the same room) or more remotely from the computing device 902. The display device 904 does not necessary comprise the full functionality of the computing device 902 but may only comprise the functionality required to render graphics to a display device 920. The rendering is performed by a graphics system 922 which comprises a GPU (Graphics Processing Unit) 923, framebuffer 924 and in some examples, one or more graphics accelerators 626. The display device 904 further comprises a communication interface 928 and a plurality of decoders 930 which may be implemented in software and/or in hardware. Where one or more of the decoders 930 are implemented in software, the display device 904 may further comprise a memory (to store the decoder instructions) and a processor (to execute the stored instructions).

The optimized video transfer is implemented in the computing device 902 using the plurality of encoders 919, the communication interface 910 (to perform the transmission to the display device 904 and in some examples to perform the multiplexing of the outputs of the encoders 919, where a separate multiplexer is not provided) and a remote display driver 934 (which may be implemented in software and stored in memory 909). As is described in detail below, the operation of the remote display driver 934 is different from the remote display driver 534 shown in FIG. 5. To the operating system 916 and applications 918 it appears that they are rendering images on the local display 912, however, the video data is transferred transparently to the remote display device 904 and is rendered on both the local display 912 and remote display 920.

The local display driver 915 advertises its capabilities to the operating system 916 (block 1002, arrow 91), where these capabilities are based on the local capabilities (e.g. graphics system 913 and display device 912). The applications 918 access the local display driver 915 and find its capabilities through the operating system 916 (block 1004, arrow 92).

When an application 918 attempts to render something to a display, it provides graphics commands to the local display driver 915 via the operating system 916 (block 1006, arrow 93). In the standard way, the graphics commands are sent to the local graphics system 913 by the local display driver 915 (block 1008, arrow 94) and the graphics system 913 renders the frames and stores them in the framebuffer 914 (block 1010).

The remote display driver 934 accesses the image data stored in the framebuffer 914 (arrow 95) and classifies and splits the data into portions (block 1012), each portion comprising a class of image data, based on the rate of update of pixels between frames stored in the framebuffer 914. The individual portions of data generated by the remote display driver 934 (in block 1012) are then sent to the encoders 919 by the remote display driver 834 (block 1014, arrow 96), such that the remote display driver 934 also performs the class/portion to encoder mapping. Referring back to FIG. 3, it can be seen that the remote display driver 934 acts as the mapping module 302, the image classifier 306 and the splitter 308.

As a result of the way that the image data is classified (i.e. on the basis of rate of change of pixels in the framebuffer 914) the classes used in this implementation may be different to previous implementations. In an example, for sets of pixels which are updated regularly, perhaps every frame, which will therefore constitute one class of image data, a lossy compression scheme (such as H. 264) may be used. Another class of image data may comprise the set of pixels which update relatively slowly and for this class, a lossless compression scheme may be used to preserve image quality.

The encoders 919 encode the image data received from the remote display driver 934 (block 1016) and the output of the encoders are sent to the communication interface 910 (arrow 97). The communication interface 910 multiplexes the encoder outputs together (block 1018) or alternatively a separate multiplexer may be provided and then the communication interface 910 transmits the multiplexed video stream over the communication link 906 to the display device 904 (block 1020, arrow 98).

Within the display device 904, the communication interface 928 demultiplexes the received signal (block 1022) and as described above, this may be based on additional information inserted into the signal when the encoder outputs were multiplexed together (in block 1018). Alternatively, a separate demultiplexer may be provided within the display device 904. The various outputs from the demultiplexing operation are output to the decoders 930 (arrow 99) which perform the decoding (block 1024). The output from the decoders are then sent to the graphics system 922 (arrow 100) where they are used to render the video on the display (block 1026).

In this example (as in the example shown in FIGS. 7 and 8), the content of the framebuffer 924 in the display device 904 almost matches the content of the framebuffer 914 in the computing device 902 (there is not an exact match because of the lossy compression); however the transfer of this data between the computing device 902 and display device 904 has been performed with improved efficiency.

In this example the remote display driver 934 does not use information obtained from elsewhere in performing the classification (in block 1012) but instead learns based on the image data stored in the local framebuffer 914. This method may therefore be implemented in scenarios where this information is not available (e.g. where the remote display driver 934 does not have access to be able to sniff graphics commands, as shown in FIG. 7 or to intercept them, as shown in FIG. 5).

Although FIG. 9 shows the framebuffer 914 being located within the graphics system 913, it will be appreciated that it may alternatively be implemented in the main processor memory 909.

The processors 508, 708, 908 shown in FIGS. 5, 7 and 9 may be microprocessors, controllers or any other suitable type of processors for processing computer executable instructions to control the operation of the computing device 502, 702, 902. In some examples, for example where a system on a chip architecture is used, the processors 508, 708, 908 may include one or more fixed function blocks (also referred to as accelerators) which implement a part of the method of operation in hardware (rather than software or firmware), e.g. in a similar manner to the graphics accelerators 526, 726, 926 shown in the display device 504, 704, 904.

The computer executable instructions may be provided using any computer-readable media that is accessible by computing based device 500, 700, 900. Computer-readable media may include, for example, computer storage media such as memory 509, 709, 909 and communications media. Computer storage media, such as memory 509, 709, 909, includes volatile and non-volatile, removable and non-removable media implemented in any method or technology for storage of information such as computer readable instructions, data structures, program modules or other data. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transport mechanism. As defined herein, computer storage media does not include communication media. Although the computer storage media (memory 509, 709, 909) is shown within the computing-based device 500, 700, 900 it will be appreciated that the storage may be distributed or located remotely and accessed via a network or other communication link (e.g. using communication interface 510, 710, 910).

The computing-based devices 500, 700, 900 may also comprise additional elements not shown in FIGS. 5, 7 and 9, such as an input controller arranged to receive and process input from one or more devices, such as a user input device (e.g. a mouse or a keyboard). This user input may be used to provide user input to the operating system 516, 716, 916 and/or application software 518, 718, 918. In an embodiment the display device 512, 712, 812 may also act as the user input device if it is a touch sensitive display device (e.g. a touch sensitive screen on a mobile telephone or tablet computer).

It will be appreciated that although FIGS. 5-10 show three different embodiments, aspects of any of these may be combined to produce further embodiments and they may be combined with aspects of the other examples described herein (e.g. with reference to any of FIGS. 1-4). For example, the second embodiment (shown in FIGS. 7-8) and the third embodiment (shown in FIGS. 9-10) may be combined such that different portions are examined (by comparing pixels) to see whether they should be encoded differently from that suggested from the sniffed graphics commands. In a combination of the first and third embodiments, learning may be applied to the remote display driver 534 such that if there are lots of updates from an application, a different mapping may be used (e.g. a lossy encoding scheme may be used based on the fact that there is motion in the video).

By using the methods described herein, the efficiency of transferring composite video data is increased. Instead of optimizing the transfer for a single class, an encoding scheme may be selected for each class which is optimum for that particular class. As described above, the different encoding schemes may include different update rates as well as different codecs. For example, by using different update rates, the data for a slide presentation (e.g. using Microsoft™ PowerPoint™) may only be transmitted when a slide changes rather than on a frame by frame basis or using any other artificial time period.

The methods described herein may be implemented in many different systems for many different applications. In various examples, however, the methods may be implemented in a remote display system, where the term 'remote' does not necessarily imply a large physical separation between the computing device and the display device. In many examples, the computing device and the remote display device may be in the same room and may enable the display on a small form factor device (such as a tablet computer or mobile telephone) to be rendered on a larger display (such as a desktop monitor). Such a system may, therefore, enable the small form factor device to be used as if it was a desktop computer. In such systems the transmission link may be wireless (e.g. using Wi-Fi™). In other examples, the remote display device may be in another geographical location (e.g. another town or another country) with the communication link being over the interne.

The terms 'computer' and 'computing device' are used herein to refer to any device with processing capability such that it can execute instructions. Those skilled in the art will realize that such processing capabilities are incorporated into many different devices and therefore the terms 'computer' and 'computing device' include PCs, servers, mobile telephones, personal digital assistants, gaming devices and many other devices.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to 'an' item refers to one or more of those items. The term 'comprising' is used herein to mean including the method blocks or elements identified, but that such blocks or elements do not comprise an exclusive list and a method or apparatus may contain additional blocks or elements.

The term 'subset' is used herein to refer to a proper subset, i.e. a subset of elements does not comprise all the elements in the set.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method comprising, at a computing device:
   using a plurality of encoders to encode different portions of display data using different encoding schemes to encode each of the different portions of display data with a selected one of the plurality of encoders;
   multiplexing the encoded different portions together to form a single stream;
   mapping each class of a plurality of classes of image data to the selected one of the plurality of encoders, wherein the selected one of the plurality of encoders is selected for a portion of display data according to the mapping; and
   transmitting the single stream to a remote display device over a transmission link, wherein the display data is divided into the different portions of display data according to the plurality of classes of image data.

2. A method according to claim 1, wherein the different portions of display data are generated by one or more applications running on the computing device and the method further comprises:
   advertising the plurality of classes of image data to the one or more applications, the plurality of classes of image data being dependent upon capabilities of the remote display device.

3. A method according to claim 2, wherein the display data is not rendered in a framebuffer at the computing device.

4. A method according to claim 1, further comprising:
updating the mapping based on one or more of: feedback from an encoder and a bandwidth constraint of the transmission link.

5. A method according to claim 1, wherein the display data comprises image data stored in a framebuffer at the computing device and the method further comprising:
monitoring graphics commands issued by one or more applications running on the computing device and which result in display data being stored in the framebuffer; and
accessing the display data stored in the framebuffer, wherein
the display data is divided into the different portions of display data using information obtained from the monitored graphics commands.

6. A method according to claim 1, wherein the display data comprises image data stored in a framebuffer at the computing device and the method further comprising:
accessing the display data stored in the framebuffer, wherein
the display data is divided into the different portions of display data based on a rate of update of pixels in the display data.

7. A method according to claim 1, wherein the transmission link is a wireless link.

8. A method according to claim 1, wherein the plurality of classes of image data comprise at least two of: a video stream, a bitmap graphic and a cursor.

9. A method according to claim 1, wherein the different encoding schemes comprise one or more of: a lossy compression scheme, a lossless compression scheme and a plurality of instances of a compression scheme, each instance using a different update rate.

10. A method according to claim 1, wherein the different encoding schemes further comprise a null encoding scheme arranged to pass data through without further encoding it.

11. A method according to claim 1, wherein using the plurality of encoders to encode the different portions of display data using the different encoding schemes comprises:
applying a second encoding scheme to the portion of display data encoded using a first encoding scheme.

12. A system comprising a computing device, the computing:
a source of display data;
a plurality of encoders, wherein each encoder is arranged to encode different portions of display data using different encoding schemes;
a multiplexer arranged to multiplex the encoded different portions together to form a single stream for transmission to a remote display device over a transmission link, wherein the display data is divided into the different portions of display data according to a plurality of classes of image data; and
a mapping module arranged to map the different portions of the display data to encoders using the different encoding schemes according to the plurality of classes of image data.

13. A system according to claim 12, wherein the computing device further comprises:
an image classifier arranged to classify the display data according to the plurality of classes of image data; and
a splitter arranged to divide the display data generated by the source of display data according to an output of the image classifier.

14. A system according to claim 12, the computing device further comprising:
a remote display driver arranged to advertise the plurality of classes of image data to the source of display data, the plurality of classes of image data being dependent upon capabilities of the remote display device, and wherein the source of display data comprises an application running on the computing device and the application generates the portions of display data.

15. A system according to claim 12, wherein the source of display data comprises one or more applications running on the computing device and the computing device further comprises:
a framebuffer; and
a driver arranged to monitor graphics commands generated by the one or more applications, access display data stored in the framebuffer and divide the display data into portions based on the plurality of classes of image data and the monitored graphics commands.

16. A system according to claim 12, wherein the source of display data comprises one or more applications running on the computing device and the computing device further comprises:
a framebuffer; and
a driver arranged to access display data stored in the framebuffer and divide the display data into portions based on the plurality of classes of image data and a rate of change of pixels in the display data.

17. A system according to claim 12, further comprising the remote display device, the remote display device comprising:
a display;
a demultiplexer arranged to demultiplex a stream of display data received from the computing device into a plurality of portions;
a plurality of decoders, each decoder arranged to decode a portion of the display data using a decoding scheme; and
a graphics system arranged to render the decoded portions of the display data to the display.

18. A system according to claim 12, wherein the computing device comprises a mobile computing device and the transmission link comprises a wireless transmission link.

* * * * *